United States Patent

[11] 3,556,460

[72] Inventor Charles N. Premo
 Springfield, Mass.
[21] Appl. No. 752,862
[22] Filed Aug. 15, 1968
[45] Patented Jan. 19, 1971
[73] Assignee Koehring Company
 Milwaukee, Wis.
 a corporation of Wisconsin. by mesne
 assignment

[54] PRODUCTION OF POROUS SHAPED ARTICLES FROM A THERMOPLASTIC SUBSTANCE
 3 Claims, 2 Drawing Figs.
[52] U.S. Cl. ................................................ 249/80;
 18/38
[51] Int. Cl. ................................................ B29h 5/00
[50] Field of Search ........................................ 18/38
 (Digest) Teflon; 249/111, 79, 80

[56] References Cited
 UNITED STATES PATENTS
 3,124,627 3/1964 Hood ........................... 249/79X
 3,196,491 7/1965 Hawkinson ................... 18/38
 3,234,605 2/1966 Thompson .................... 18/38X
 3,321,932 5/1967 Orphey ......................... 249/111X Primary Examiner—H. A. Kilby, Jr.
Attorney—Chapin, Neal and Dempsey ABSTRACT: A pressurized chest, such as a steam chest, for a molding machine comprising a base, preferably formed of aluminum and mounted upon a steel or iron platen, and a cavity-defining mold face, also preferably formed of aluminum and mounted upon the base in chest-enclosing manner, with those interior walls of the chest, not directly contributing to the heating or cooling of the part being molded within the cavity, being coated with a lining of a plastic resin having a low limit of thermal conductivity to accommodate to the heat dissipation problem and to preclude against an excessive heat loss.

PATENTED JAN 19 1971 3,556,460

INVENTOR
CHARLES N. PREMO
Kenwood Ross and
BY Chester E. Flavin
ATTORNEYS

PRODUCTION OF POROUS SHAPED ARTICLES FROM A THERMOPLASTIC SUBSTANCE

BACKGROUND OF THE INVENTION

1. Field of the Invention

The invention relates generally to improvements in mold constructions as used in connection with the molding of charges of plastic beads or pellets to form shaped articles in enclosed or shaped mold cavities and particularly to means in such construction for precluding heat loss and conserving heat dissipation from the mold cavity.

2. Description of the Prior Art

Stastny U.S. Pat. Nos. 2,744,291 of May 8, 1956 and 2,787,809 of Apr. 9, 1957, disclosed a process for the production of shaped articles from synthetic thermoplastic substances within closed containers and taught that, when beads contain in homogeneous dispersion a liquid which does not dissolve or swell the thermoplastic substance, with the boiling point thereof being lower than the softening point of the synthetic substances, such beads may be heated in a closed mold to a temperature above the boiling point of the liquid serving as the raising agent and above the softening point of the thermoplastic substance, so that the individual beads may be united together to form a homogeneous porous article of a shape as determined by the configuration of the mold cavity.

Polystyrene, polyvinyl chloride, polyvinylidene chloride, polyacrylic esters, polymethacrylic esters, polyacrylongitrile, interpolymers of butadiene or other dienes and styrene or acrylonitrile are suitable for processing according to this method.

The molding of articles of foamed materials is becoming increasingly important due to the reduction of material use by substituting air or gases in lieu of solid plastics. In this manner, strengths or reductions thereof are incorporated into the molded articles to whatever degree is desired. In essence, the use of foamed materials enables one to use the exact structural density of material required to achieve a desired effect with minimal material use.

The enormous advantage of material savings by the use of foamed materials is offset to a small degree by the lower heat transfer brought about through the introduction of air or gases into the plastic material. This lower heat transfer necessitates the extension of the molding cycle to permit the complete fusion of the individual beads and hence the concern for the excessive use of utilities. By introducing a boundary layer of low heat conductivity material, it is possible to counteract partially the adverse effects of foam molding which result in the greater consumption of utilities.

The conventional mold suffers from the fact that from 60 to 80 percent of its surface area is nonfunctional (i.e. does not contribute directly to the heating or cooling of the part being molded) so as to serve disadvantageously as radiating surfaces which cause the heat to be drawn away from the mold. Accordingly, a disproportionate amount of the mold is being alternately heated and cooled during the molding process, all so as to dictate a greater consumption of utilities.

SUMMARY OF THE INVENTION

This invention provides means in the form of a buffer or boundary layer of low heat conductivity material on the inside walls of a stream chest, as used in closed container molding, wherewith the heat loss is significantly reduced allowing less stream required for heating and less water required for cooling during the molding operation.

DESCRIPTION OF THE PREFERRED EMBODIMENT

Figure 1:
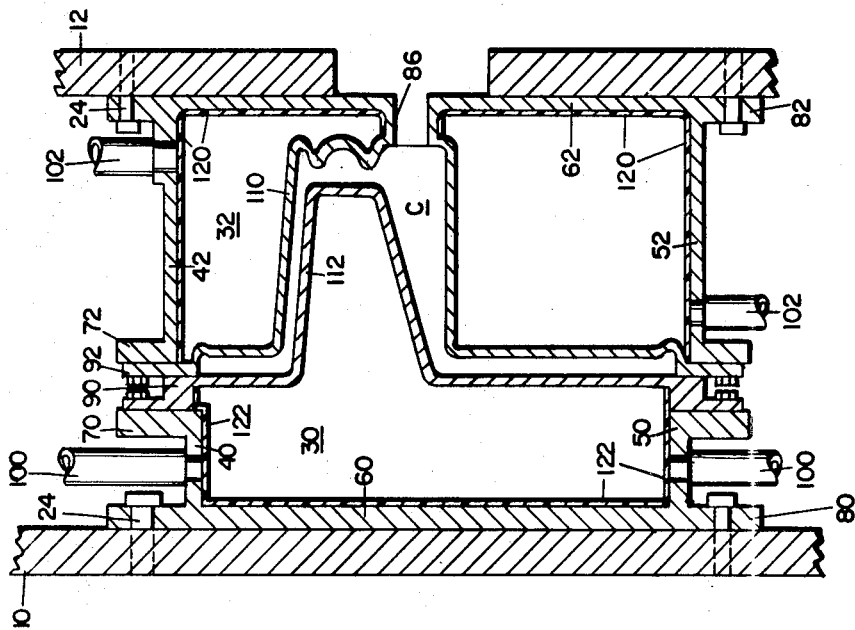
FIG. 1 is a fragmentary sectional view through a pair of mold platens and associated steam chests and mold faces of a typical molding machine.
Figure 2:
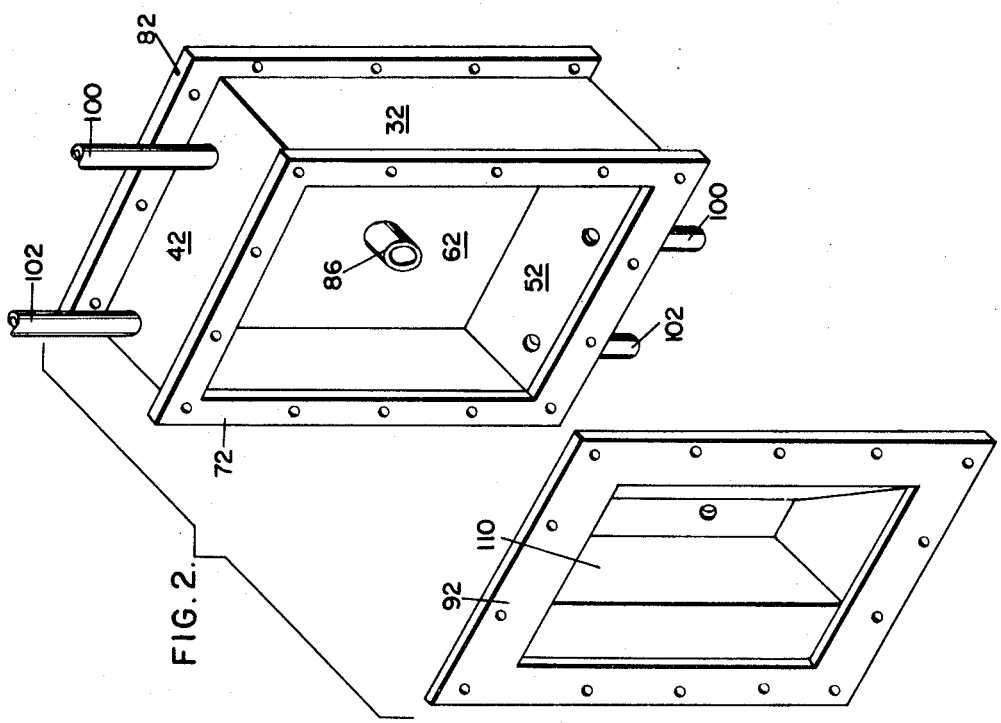
FIG. 2 is an exploded view, in perspective, of a stream chest and complementary cavity-defining mold face.

The conventional molding machine includes a pair of steel or iron platens 10, 12, one of which is usually stationary and one of which is movable towards and away from the stationary platen, the platens being mounted, in opposition to and in register with one another, on mold supports of a power-operated press. The platens are disposed in a vertical or a horizontal plane, depending upon the type of press employed.

The molds per se consist of opposing and complementary mold halves which close as to each other to from the molding cavity or cavities, it being usual to close the mold halves for charging preliminary to molding and to open same for ejecting the molded article or articles subsequent thereto.

Outboard of the mold halves or mold faces, steam chests are provided, same usually being formed so as to be universal in nature, a mold half being clamped thereto and capable of being changed according to the particular article desired to be formed, all wherefore a fast changing of molds is allowed. The steam chest is usually in the form of a rectangular-shaped open faced box of some depth, mounted on the platen of the machine, one such chest being mounted on each of the stationary and moving platens.

The steam chest is normally provided with a flange around its open face, equipped with dogs for securing the flange of a mold face mountable thereupon with the joint between steam chest and mold face being usually sealed with such as a silicone rubber gasket.

Each chest is supplied with steam through one or more permanently connected lines for supplying the steam needed for the molding and fusion of the part in the cavity. Each chest is also supplied with one or more permanently connected lines for supplying fluid for the cooling of the mold and the molded part. Each chest also has a permanently-connected drain valve for maintaining pressure within the chest as desired, for opening the chest to atmosphere also as desired, and for allowing drainage of the cooling medium from the chest and into such as a suitable reservoir when not required. Such drain valves may be actuated with air cylinders so that should the pressure within the chest become excessive for any reason, they may be automatically opened to relieve this excess pressure.

Steel or iron is employed in the platens because of the factors of strength and alignment and deflection, each all-important in the molding operation, operational compressive or holding forces of as much as 60,000 pounds being common.

The platens, vertically-disposed or horizontally-disposed as aforesaid, each mount a steam chest supported relative to its respective platen as by bolting 24.

The steam chests may include sidewalls 30, 32, a top wall 40, 42, a bottom wall 50, 52, a rear wall 60, 62, and an outboard peripheral flange 70, 72, and an inboard peripheral flange 80, 82 respectively.

One steam chest will include a gate means 86 therethrough and through which the molding material is passed as the mold cavity is charged.

A flanged mold face 90, 92 is mounted upon the respective flange 70, 72 at the outboard face of the respective steam chest so is completely to enclose the steam chest.

Steam lines 100 and water lines 102 lead into and from each steam chest. Both steam chests are thus seen to be suitably jacketed and provided with inlets and outlets for ingress and egress respectively of steam for mold heating and/or fluid for mold cooling.

The mold or die is formed by juxtaposing the oppositely-facing, inboard working mold faces 90, 92 as mold halves into confronting or closed relationship with each other, one or both faces being provided with suitable depressions 110 giving same certain female characteristics which may be complementary to suitable projections 112 giving certain male characteristics in the other or both of the faces, all in manner to define therebetween a cavity C of predetermined size and configuration to yield the desired article to be molded or formed therein.

The most practical material for molding or casting the steam chests and mold faces into the intricate shapes required for present day molding applications has been found to be aluminum, same having a high coefficient of heat transfer and expansion, not to mention ease and economy of production.

The expansion factor between the steel of the platen and the aluminum of the steam chest and mold face being from 1 to 2½ times, a continuous expansion and contraction of the steam chests and mold faces, during operational use, causes the parts to shift out of register, all so as to dictate a continuing adjusting program. Also, such shifting requires dowel pinning or other devices in the effort to offset these effects.

In such closed container molding, all surface areas of the steam chest are exposed to heat, leading to aggravating problems of heat loss. Inasmuch as most molds have a molding area approximating 25 to 30 percent of the entirety of its radiation area, much of the heat loss is through the side and back walls of the steam chest. Additionally, the mold halves usually represent approximately 30 percent of the total weight of the mold so as to give rise to a heat loss of 70 percent. Accordingly, the coating of the nonfunctional walls to preclude heat dissipation is indicated.

Plastic resins, having a low limit of thermal conductivity, are useful for this coating function. Any of the fluorine-containing resins, as for example, polytetrafluoroethylene or polytrifluoroethylene, or polyfluorobutylacrylate, have wide acceptance as coatings for metals and have been found useful in the present instance. Polytetrafluoroethylene has been found especially suitable, it having as a striking physical characteristic an outstanding ability to resist wetting and sticking, being impervious to water and moisture and presenting excellent slip or release properties. Too, its resistivity is very high, its power factor loss is low, and its specific dielectric capacity is close to that of air. Furthermore, it has an extremely low coefficient of thermal conductivity and is dimensionally stable under normal environmental conditions.

The selected nonfunctional surface areas 40 and 42, 50 and 52, and 60 and 62 of the respective steam chests are conditioned with a cement whereby a strong cohesive bond is established between the layer 120, 122 of polytetrafluoroethylene and the respective metal surfaces upon which it is layed down.

When applied to the aluminum, it acts as a buffer or boundary layer resulting in a significant reduction of heat loss.

Thus, those interior walls of the chests, not directly contributing to the heating or cooling of the part being molded within the cavity, are coated with a lining of a plastic resin having a low limit of thermal conductivity to accommodate to the heat dissipation problem and to preclude against an excessive heat loss.

I claim:

1. In a steam chest for a molding machine comprising, an open ended base and a cavitized mold face secured to the base, the improvement which comprises the inner walls of the base being coated with a non-sticking, water impervious boundary layer of a plastic resin having a low limit of thermal conductivity.

2. A steam chest according to claim 1, wherein the plastic resin is polytetrafluoroethylene.

3. A steam chest according to claim 1, wherein the mold face and the base are aluminum.